US011909538B2

(12) United States Patent
Pick et al.

(10) Patent No.: US 11,909,538 B2
(45) Date of Patent: Feb. 20, 2024

(54) PROCESSING OF PORTIONS OF A TRANSPORT BLOCK THAT FAILS A CYCLIC REDUNDANCY CHECK

(71) Applicant: QUALCOMM Incorporated, San Diego, CA (US)

(72) Inventors: Jacob Pick, Beit Zait (IL); Assaf Touboul, Netanya (IL); Shay Landis, Hod Hasharon (IL); Shlomit Shaked, Rosh Haayin (IL); Michael Levitsky, Rehovot (IL); Daniel Paz, Geva Carmel (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/451,225

(22) Filed: Oct. 18, 2021

(65) Prior Publication Data

US 2023/0118778 A1 Apr. 20, 2023

(51) Int. Cl.
*H04L 1/20* (2006.01)
*H04L 1/00* (2006.01)
*H04L 5/00* (2006.01)

(52) U.S. Cl.
CPC ............ *H04L 1/201* (2013.01); *H04L 1/0054* (2013.01); *H04L 1/0061* (2013.01); *H04L 5/0055* (2013.01)

(58) Field of Classification Search
CPC ..... H04L 1/201; H04L 1/0054; H04L 1/0061; H04L 5/0055
See application file for complete search history.

(56) References Cited

U.S. PATENT DOCUMENTS

| | | | | |
|---|---|---|---|---|
| 11,664,927 B2* | 5/2023 | Pan | ...................... | H04L 27/2605 370/329 |
| 2012/0287973 A1* | 11/2012 | Shen | .................. | H03M 13/6306 375/341 |
| 2013/0013976 A1* | 1/2013 | Earnshaw | ......... | H03M 13/6306 714/E11.032 |
| 2014/0006911 A1 | 1/2014 | Gorokhov et al. | | |
| 2014/0153628 A1* | 6/2014 | Vojcic | .................. | H03M 13/612 375/227 |
| 2015/0043473 A1* | 2/2015 | Kim | ...................... | H04L 5/0053 370/329 |

(Continued)

FOREIGN PATENT DOCUMENTS

EP 2224632 A1 9/2010

OTHER PUBLICATIONS

International Search Report and Written Opinion—PCT/US2022/076486—ISA/EPO—dated Mar. 2, 2023.

(Continued)

*Primary Examiner* — Oussama Roudani
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a transport block (TB), the receiving the TB including performing log likelihood ratio (LLR) calculations on one or more parts of the TB based at least in part on a determination that the TB is likely to fail a cyclic redundancy check (CRC). The UE may transmit an indication of the one or more parts of the TB for which the UE performed LLR calculations. Numerous other aspects are described.

31 Claims, 8 Drawing Sheets

(56) References Cited

U.S. PATENT DOCUMENTS

| | | |
|---|---|---|
| 2016/0218830 A1* | 7/2016 | Martinez ............... H04L 1/0045 |
| 2016/0226528 A1 | 8/2016 | Serbetli et al. |
| 2016/0329995 A1 | 11/2016 | Jiang et al. |
| 2019/0342055 A1 | 11/2019 | Zhang et al. |
| 2020/0295882 A1 | 9/2020 | Wang et al. |
| 2020/0344006 A1 | 10/2020 | Shellhammer et al. |
| 2021/0099262 A1 | 4/2021 | El Asmar et al. |
| 2021/0376991 A1* | 12/2021 | Kim ..................... H04L 1/1864 |

OTHER PUBLICATIONS

Partial International Search Report—PCT/US2022/076486—ISA/EPO—dated Dec. 16, 2022.

* cited by examiner

PROCESSING OF PORTIONS OF A TRANSPORT BLOCK THAT FAILS A CYCLIC REDUNDANCY CHECK

FIELD OF THE DISCLOSURE

Aspects of the present disclosure generally relate to wireless communication and to techniques and apparatuses for processing of portions of a transport block that fails a cyclic redundancy check.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a transport block (TB), the receiving the TB including performing log likelihood ratio (LLR) calculations on one or more parts of the TB based at least in part on a determination that the TB is likely to fail a cyclic redundancy check (CRC). The method may include transmitting an indication of the one or more parts of the TB for which the UE performed LLR calculations.

Some aspects described herein relate to a method of wireless communication performed by a base station. The method may include transmitting a TB. The method may include receiving an indication of one or more parts of the TB for which a UE performed LLR calculations.

Some aspects described herein relate to a UE for wireless communication. The user equipment may include a memory and one or more processors coupled to the memory. The one or more processors may be configured to receive a TB including performing LLR calculations on one or more parts of the TB based at least in part on a determination that the TB is likely to fail a CRC. The one or more processors may be configured to transmit an indication of the one or more parts of the TB for which the UE performed LLR calculations.

Some aspects described herein relate to a base station for wireless communication. The base station may include a memory and one or more processors coupled to the memory. The one or more processors may be configured to transmit a TB. The one or more processors may be configured to receive an indication of one or more parts of the TB for which a UE performed LLR calculations.

Some aspects described herein relate to a non-transitory computer-readable medium that stores a set of instructions for wireless communication by a UE. The set of instructions, when executed by one or more processors of the UE, may cause the UE to receive a TB including performing LLR calculations on one or more parts of the TB based at least in part on a determination that the TB is likely to fail a CRC. The set of instructions, when executed by one or more processors of the UE, may cause the UE to transmit an indication of the one or more parts of the TB for which the UE performed LLR calculations.

Some aspects described herein relate to a non-transitory computer-readable medium that stores a set of instructions for wireless communication by a base station. The set of instructions, when executed by one or more processors of the base station, may cause the base station to transmit a TB. The set of instructions, when executed by one or more processors of the base station, may cause the base station to receive an indication of one or more parts of the TB for which a UE performed LLR calculations.

Some aspects described herein relate to an apparatus for wireless communication. The apparatus may include means for receiving a TB including performing LLR calculations on one or more parts of the TB based at least in part on a determination that the TB is likely to fail a CRC. The apparatus may include means for transmitting an indication of the one or more parts of the TB for which the apparatus performed LLR calculations.

Some aspects described herein relate to an apparatus for wireless communication. The apparatus may include means for transmitting a TB. The apparatus may include means for receiving an indication of one or more parts of the TB for which a UE performed LLR calculations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
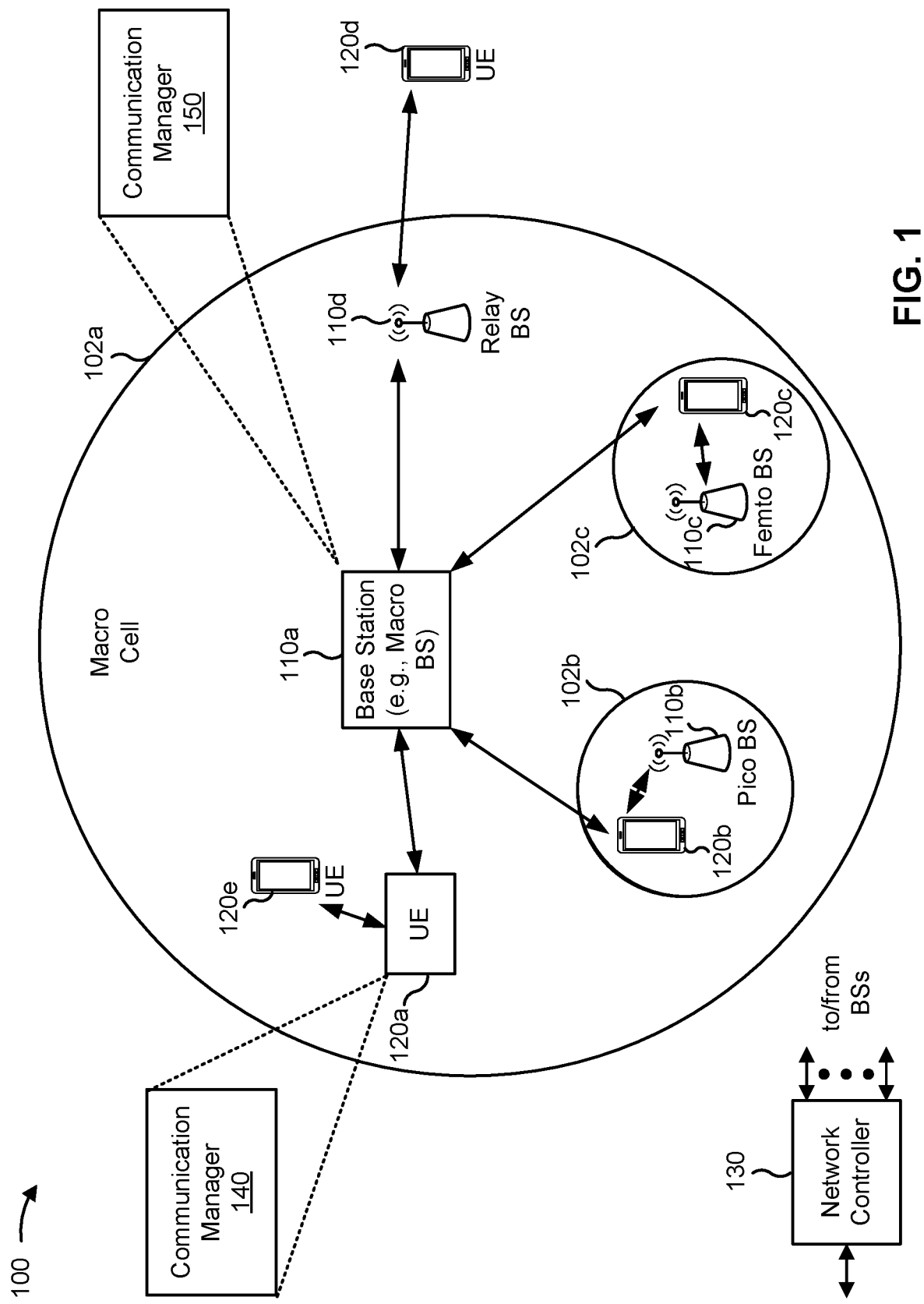
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a TB, the receiving the TB including performing LLR calculations on one or more parts of the TB based at least in part on a determination that the TB is likely to fail a CRC; and transmit an indication of the one or more parts of the TB for which the UE performed LLR calculations. Additionally, or alternatively, the communication manager 140 may perform one or more other operations described herein.

In some aspects, the base station 110 may include a communication manager 150. As described in more detail elsewhere herein, the communication manager 150 may transmit a TB; and receive an indication of one or more parts of the TB for which a UE performed LLR calculations. Additionally, or alternatively, the communication manager 150 may perform one or more other operations described herein.

As indicated above, FIG. 1 is provided as an example. Other examples may differ from what is described with regard to FIG. 1.

Figure 2:
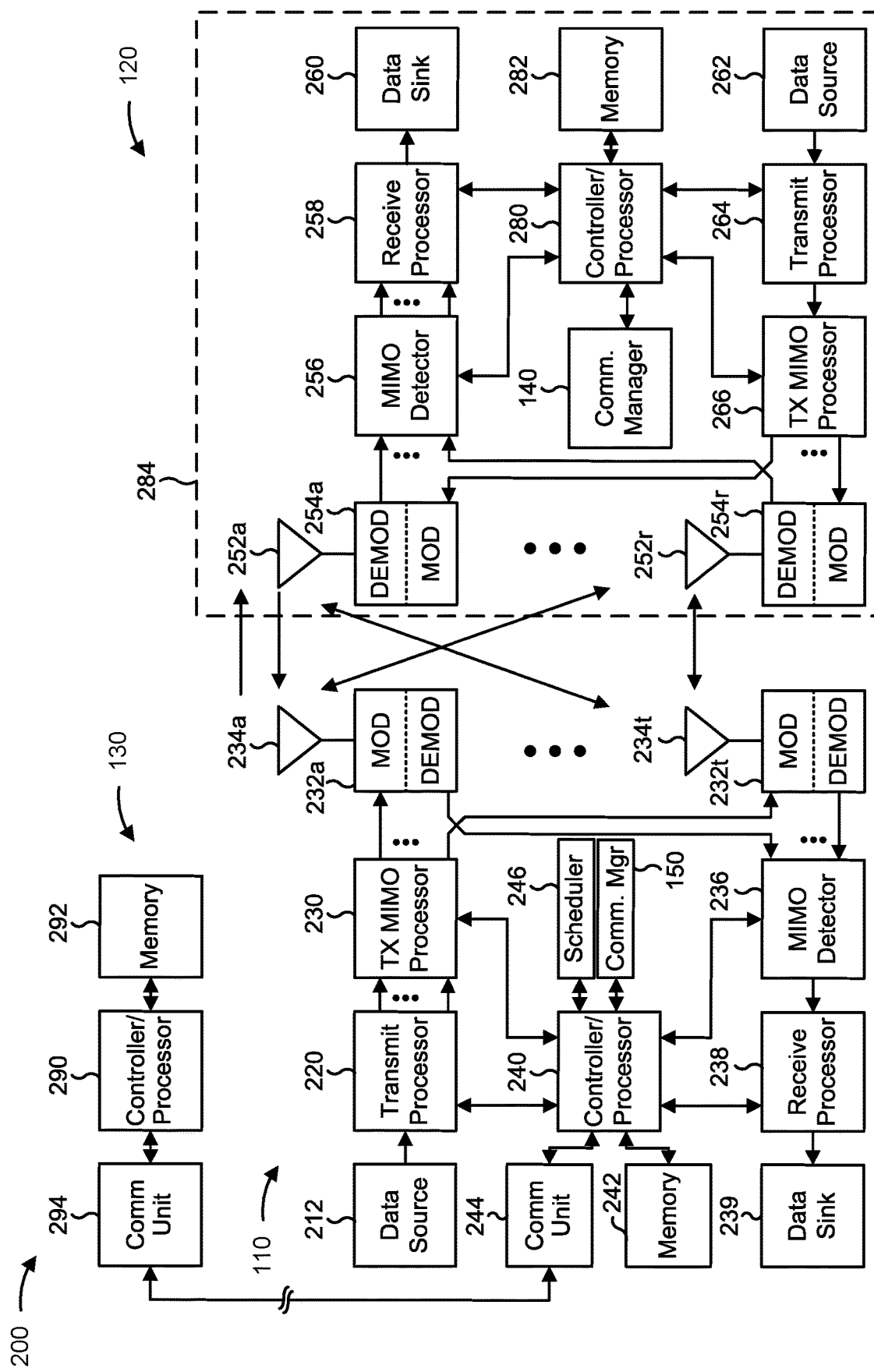
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with processing of portions of a transport block that fails a cyclic redundancy check, as described in more detail elsewhere herein. For example, the controller/processor 240 of the base station 110, the controller/processor 280 of the UE 120, and/or any other component(s) of FIG. 2 may perform or direct operations of, for example, process 500 FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a TB, the receiving the TB, the receiving the TB including performing LLR calculations on one or more parts of the TB based at least in part on a determination that the TB is likely to fail a CRC (e.g., using antenna 252, modem 254, MIMO detector 256, receive processor 258, controller/processor 280, and/or memory 282, among other examples); and/or means for transmitting an indication of the one or more parts of the TB for which the UE performed LLR calculations (e.g., using controller/processor 280, transmit processor 264, TX MIMO processor 266, modem 254, antenna 252, and/or memory 282, among other examples). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a TB (e.g., using controller/processor 240, transmit processor 220, TX MIMO processor 230, modem 232, antenna 234, and/or memory 242, among other examples); and/or means for receiving an indication of one or more parts of the TB for which a UE performed LLR calculations (e.g., using antenna 234, modem 232, MIMO detector 236, receive processor 238, controller/processor 240, and/or memory 242, among other examples). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
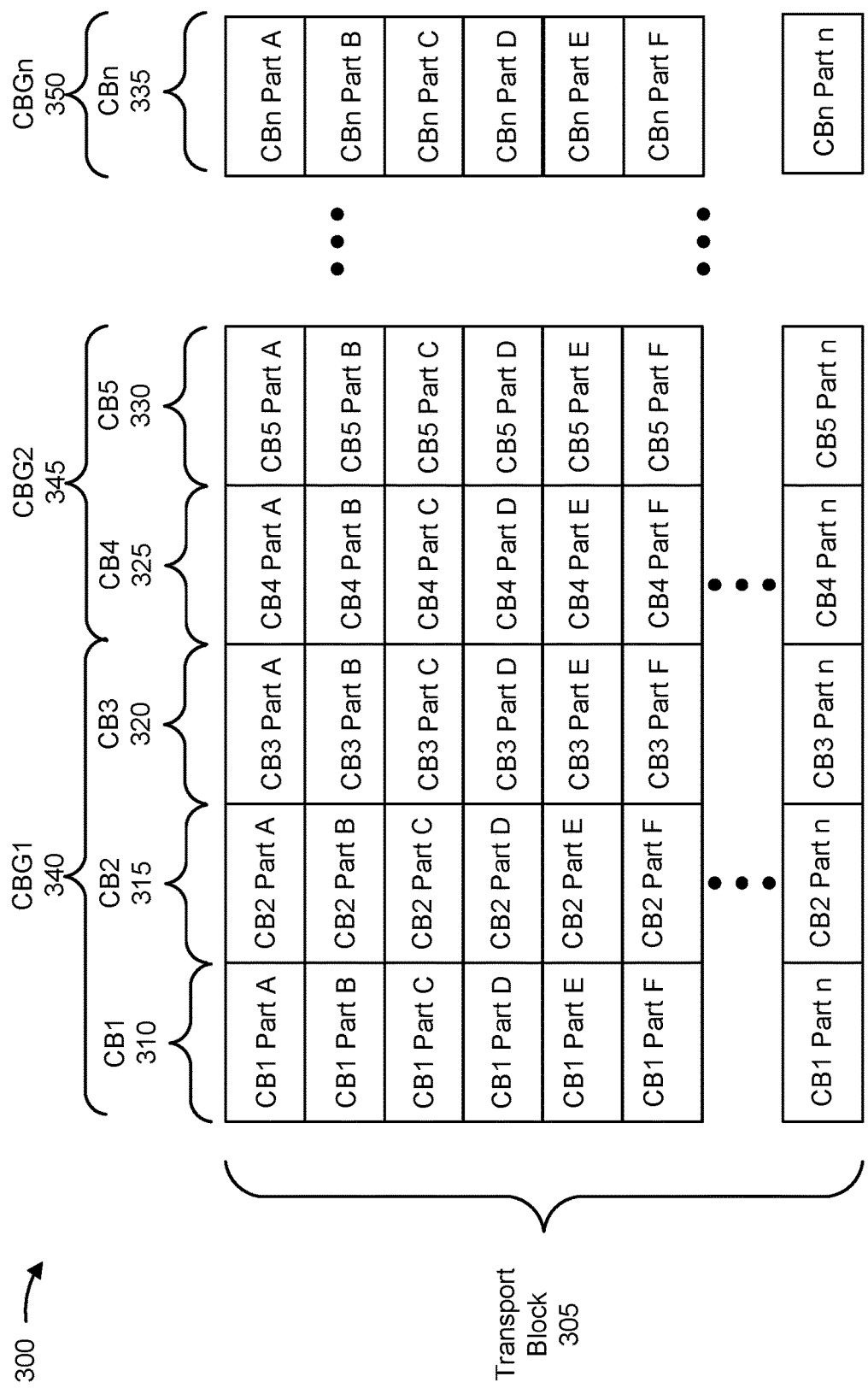
FIG. 3 is a diagram illustrating an example of a transport block, in accordance with the present disclosure.

FIG. 3 is a diagram illustrating an example 300 of a TB 305, in accordance with the present disclosure. The TB 305 may be transmitted from a base station to a UE or from a UE to a UE (e.g., in a sidelink connection).

The TB 305 includes one or more code blocks (CBs), such as code block 1 (CB1) 310, CB2 315, CB3 320, CB4 325, CB4 330, and/or CBn 335. The one or more CBs may include signals may occupy one or more resource elements and/or resource blocks. The one or more CBs may share a time resource or adjacent time resources, or may occupy non-adjacent time resources. Each CB may have one or more CB parts, such as Part A, Part B, Part C, Part D, Part E, Part frequency, and/or Part n. For example, each CB may be divided into 16 CB parts, 8 CB parts, 4 CB parts, or 2 CB parts, among other examples. Alternatively, each CB may be divided into 3 CB parts, 6 CB parts, 9 CB parts, 10 CB parts, 12 CB parts, among other examples.

The one or more CBs may be partitions and/or organized into one or more code block groups (CBGs), such as CB group 1 (CBG1) 340, CBG2 345, and/or CBGn 350. The one or more CBGs may have equal numbers of CBs or may have different numbers of CBs.

When a receiving device (e.g., a UE or a base station) attempts to receive the TB 305 (e.g., based at least in part on scheduling information), the receiving device may attempt to decode each CB part. For example, the receiving device may perform LLR calculations on signals in each of the CB parts. Performing LLR calculations may be necessary to receive the TB and/or to decode the TB and may consume computing and power resources of the receiving device. However, if the TB is likely to fail a CRC and the receiving device is unlikely to be received and/or decoded, performing LLR calculations on signals in each of the CB parts may unnecessarily consume the computing and power resources of the receiving device.

As indicated above, FIG. 3 is provided as an example. Other examples may differ from what is described with regard to FIG. 3.

In some aspects described herein, a receiving device (e.g., a UE or a base station, among other examples) may perform reduced operations (e.g., minimum operations) that are beneficial to receiving the TB during a re-transmission (e.g., with the TB passing CRC). For example, the receiving device may process a reduced number of LLRs (e.g., a minimum number of LLRs or fewer than all possible LLRs, among other examples) such that a likelihood of passing CRC at the re-transmission is not reduced or is reduced by an amount that satisfies a threshold (e.g., the amount of reduced likelihood is less than the threshold). In some aspects, the LLRs may be stored until reception of the re-transmission and/or a subsequent re-transmission that passes CRC. For example, the LLRs may be stored at an incremental redundancy (IR) buffer of the receiving device.

In some aspects, the receiving device may transmit an indication (e.g., to a transmitting device) of one or more parts of the TB for which the receiving device performed LLR calculations and/or associated with one or more parts of the IR buffer that the receiving device processed in the TB (e.g., in a previous slot). In some aspects, the receiving device may transmit the indication along with a negative acknowledgment (NACK) associated with hybrid automatic repeat request (HARQ) feedback. In some aspects, the transmitting device may use the indication to determine a configuration for the re-transmission of the TB, for example, based at least in part on the indication the transmitting device may select transmission parameters that improve a likelihood of the re-transmission passing CRC.

Alternatively, the receiving device may not transmit the indication to the transmitting device and the LLR. For example, performance of the LLR calculations on only the one or more parts of the TB (e.g., less than all parts of the TB) may be transparent to the transmitting device.

In some aspects, the receiving device may perform one or more operations associated with processing the reduced number of LLRs for the TB that is unlikely to pass CRC. For example, the receiving device may perform an estimation (e.g., the receiving device may predict) of whether the TB is likely to pass CRC in a current transmission of the TB. For example, the receiving device may use channel state information (CSI), an attempt to decode a portion of the TB, and/or results of an attempt to decode a previous TB to predict whether the TB is likely to pass CRC in the current transmission. For example, the receiving device may use the attempt to decode the previous TB if the previous TB and the TB are transmitted with a same set of transmission parameters (e.g., based at least in part on not yet providing feedback on the previous TB) and/or based at least in part on a determination (e.g., using CSI) that a channel used to receive the TB has a rate of change that satisfies a threshold (e.g., the channel is a slow changing channel), among other examples.

If the receiving device estimates that the TB is likely to pass CRC, the receiving device may perform conventional processing of the TB (e.g., attempting to decode signals from each CB part). If the receiving device estimates that the TB is unlikely to pass CRC (e.g., with a likelihood that satisfies a threshold), the receiving device may reduce an amount of processing on the TB (e.g., based at least in part on performing LLR calculations on one or more parts of the TB and not all parts of the TB).

For example, based at least in part on estimating that the TB is unlikely to pass CRC, the receiving device may perform LLR calculations on one or more resource elements (REs) estimated to improve a likelihood (e.g., by a threshold amount) of passing CRC (e.g., needed to pass CRC) on a re-transmission. In some aspects, the one or more REs may be associated with CBs where additional LLRs are expected to be needed to pass CRC on the re-transmission to pass CRC. In some aspects, the receiving device may perform LLR calculations on the one or more REs that the receiving device estimates may be used (e.g., may be required) for not harming a likelihood of the re-transmission of the TB to pass CRC. In some aspects, the receiving device may not perform LLR calculations on one or more additional REs for which performing the LLR calculations is not expected to improve the likelihood of passing CRC on the re-transmission (e.g., not to improve the likelihood by a threshold amount). Depending on a mode of operation and/or a configuration, the receiving device may report (or not) an indication of the one or more parts of the transport block that were processed during reception of the TB (e.g., a slot of the TB), for example, along with a NACK report.

In some aspects, the receiving device may transmit an indication of a capability to report, and/or support for reporting, the one or more parts of the TB for which the receiving device performed LLR calculations. For example, the receiving device may transmit the indication via a physical uplink shared channel (PUSCH) prior to radio resource control (RRC) configuration of the receiving device. In some aspects, the indication (e.g., a NACK) may indicate the one or more parts of the TB using a granularity (e.g., configured by the transmitting device or the receiving device, among other examples) such as a CBG, a CB, or a CB part (e.g., ⅛ CB, ¼ CB, or ½ CB, among other examples).

In some aspects, the transmitting device (e.g., a base station or a UE) may use (e.g., exploit) the indication and/or information that indicates the one or more parts of the TB for which the receiving device performed the LLR calculations to determine a configuration for the re-transmission of the TB. For example, the transmitting device may configure a redundancy version (RV) for the re-transmission based at least in part on the indication (e.g., the transmitting device may apply an algorithm to adjust the RV to one or more portions of the TB and/or processed parts of the slot, among other examples). In some aspects, the transmitting device may consider processed parts from all CBGs and/or CBs and decide upon optimal common RV.

In some aspects, the transmitting device may use the indication (e.g., an indicated part of an associated slot that was processed) to update a modulation order selection for the re-transmission of the TB. For example, the transmitting device may change a modulation order of the re-transmission while preserving code related re-transmission definitions (e.g., using an MCS index that indicates a modulation order and not a target code rate or spectral efficiency). In some aspects, the transmitting device may transmit downlink control information (DCI) to schedule the re-transmission with the configuration, such as the RV, precoding (not indicated in DCI), and/or MCS based at least in part on the LLRs calculated and/or processed.

In some aspects, the receiving device my receive an indication (e.g., a semi-static report configured by the transmitting device) of a granularity of the one or more parts of the TB for performing LLR calculations and/or for reporting the one or more parts of the TB (e.g., as an enhanced NACK). In some aspects, the indication may include codepoints that indicate different granularities. For example, a codepoint of 000 may indicate a normal NACK without an indication of the one or more parts of the TB, a code point of 001 may indicate a granularity of CBGs for reporting, a code point of 010 may indicate a granularity of CBs for reporting, a code point of 011 may indicate a granularity of ½ CBs for reporting, a code point of 100 may indicate a granularity of ¼ CBs for reporting, and/or a code point of 101 may indicate a granularity of ⅛ CBs for reporting.

In some aspects, the receiving device may transmit the indication of the one or more parts of the TB via the NACK message using a bit map. For example, the bitmap may include a bitmap per CB or CBG with a number of bits that is based at least in part on a granularity configured for reporting. A bitmap per CB or CBG may indicate whether units (e.g., based at least in part on the granularity) of the CB or CBG are processed with LLR calculations (e.g., 0 indicates a not processed part and 1 indicates a processed part). For example, a ⅛ CB granularity may have a bit map of size of 8 bits. Additionally, or alternatively, the indication may include a bitmap of CBs or CBGs (e.g., with a granularity of a CB or CBG based at least in part on a configuration) to indicate whether CBs or CBGs are reported (e.g., having an associated bitmap) and/or whether the CB or CBG is processed with LLR calculations. In some aspects, the indication may include a bitmap with N bits to indicate a number N of CBs or CBGs per slot that are reported and/or processed with LLR calculations.

Based at least in part on the receiving device performing LLR calculations (e.g., processing) one or more parts of the TB based at least in part on a determination that the TB is likely to fail a CRC, the receiving device may conserve processing and/or power resources that may have otherwise been consumed to perform LLR calculations on all parts of the TB. Additionally, or alternatively, based at least in part on performing the LLR calculations of the one or more parts of the TB that are determined to improve a likelihood of passing the CRC in a re-transmission of the TB, the receiving device may not damage the likelihood (e.g., reduce the likelihood by a threshold amount) of passing the CRC, in comparison to not performing LLR calculations on any parts of the TB. In this way, the receiving device may conserve computing, power, network, and/or communication resources that may have otherwise been used to detect and correct a failure of the re-transmission of the TB to pass CRC.

Figure 4:
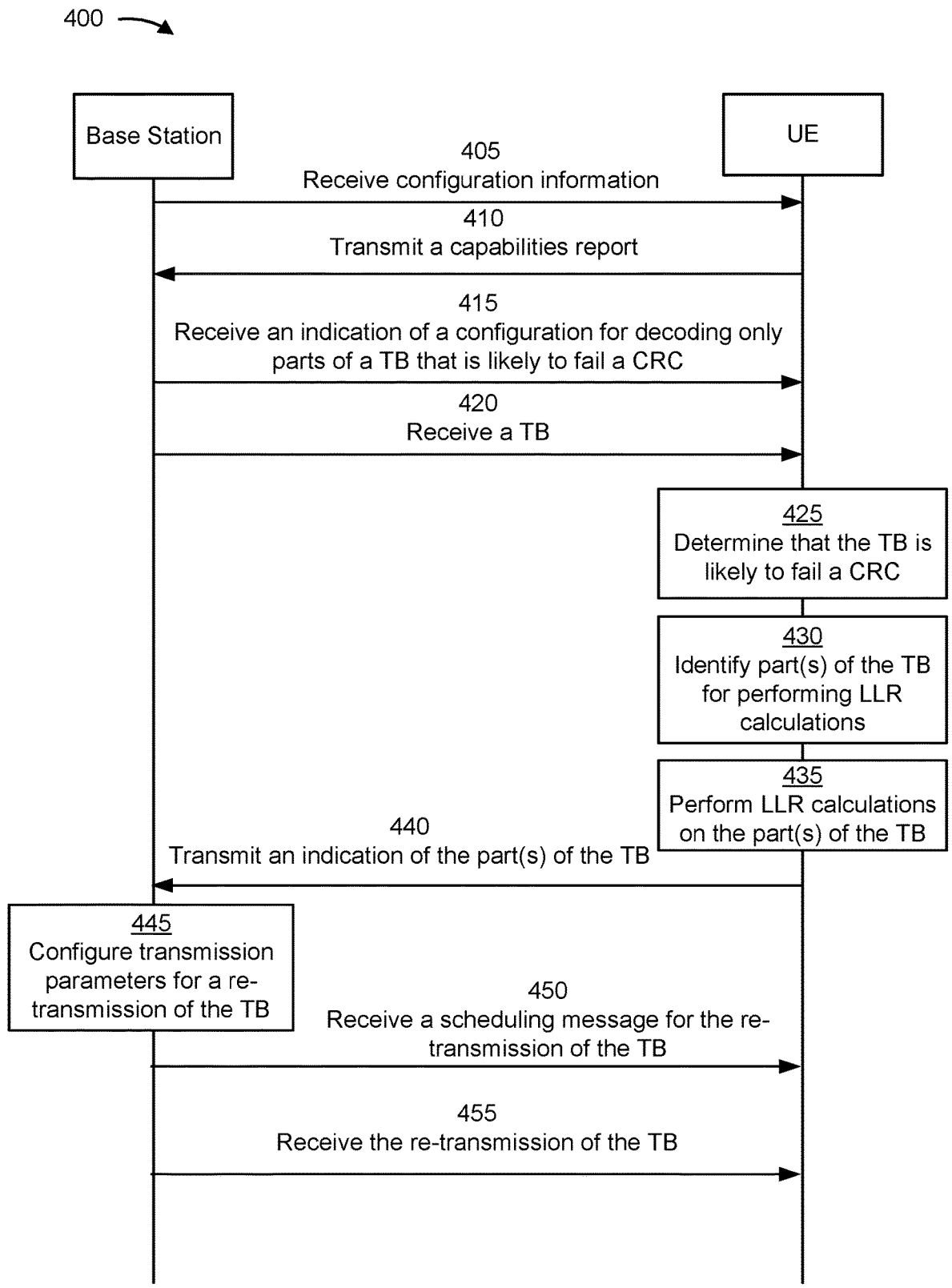
FIG. 4 is a diagram illustrating an example associated with processing of portions of a transport block that fails a cyclic redundancy check, in accordance with the present disclosure.

FIG. 4 is a diagram illustrating an example 400 associated with processing of portions of a transport block that fails a CRC, in accordance with the present disclosure. As shown in FIG. 4, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 4. Although the description of FIG. 4 uses an example where a transmitting device is a base station and a receiving device is a UE, the operations may be performed with a UE as the transmitting device and the base station as the receiving device. Additionally, or alternatively, the operations may be performed with a first UE as the transmitting device and a second UE as the receiving device.

As shown by reference number 405, the base station may transmit, and the UE may receive, configuration information. In some aspects, the UE may receive the configuration information via one or more of RRC signaling, one or more medium access control (MAC)-control elements (CEs), and/or DCI, among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to decode, process, and/or perform LLR calculations for only one or more parts of a TB that is likely to fail a CRC. In some aspects, the configuration information may indicate that the UE is to identify the one or more parts of the TB for performing the LLR calculations. In some aspects, the configuration information may indicate one or more parameters for identifying the one or more parts of the TB for performing the LLR calculations. In some aspects, the configuration information may indicate a configuration for transmitting an indication of the one or more parts of the TB for which the LLR calculations have been performed.

The UE may configure itself based at least in part on the configuration information. In some aspects, the UE may be configured to perform one or more operations described herein based at least in part on the configuration information.

As shown by reference number 410, the UE may transmit, and the base station may receive, a capabilities report. In some aspects, the capabilities report may indicate UE support for performing LLR calculations on fewer than all parts of a TB based at least in part on a determination that the transport block is likely to fail the CRC (e.g., has a likelihood to fail that satisfies a threshold). In some aspects, the capabilities report may indicate a capability of the UE to transmit the indication of one or more parts of the TB for which the UE performed the LLR calculations. In some aspects, the UE may transmit the capabilities report via a PUSCH communication and/or via RRC signaling (e.g., during a connection procedure).

As shown by reference number 415, the UE may receive, and the base station may transmit, an indication of a configuration for decoding only one or more parts of a TB that are likely to fail a CRC. In some aspects, the UE may receive the configuration via RRC signaling and/or MAC signaling. In some aspects, the configuration may include an indication of a granularity of the one or more parts of the TB on which the UE is to perform LLR calculations. Additionally, or alternatively, the configuration may include an indication of a granularity of an indication, to be transmitted by the UE after decoding only the one or more portions of the TB, of the one or more parts of the TB for which the UE performed the LLR calculations.

As shown by reference number 420, the UE may receive, and the base station may transmit, the TB. The TB may include one or more CB groups, one or more CBs, and/or one or more CB parts. In some aspects, the UE may receive the TB as signaling received over one or more REs and/or resource blocks over a period of time. In some aspects, the UE may perform one or more operations on the TB to attempt to demodulate and/or decode the TB.

As shown by reference number 425, the UE (e.g., as part of receiving the TB) may determine that the TB is likely to fail the CRC. For example, the UE may determine that the TB is likely to fail the CRC before beginning to attempt to decode the TB (e.g., based at least in part on an attempt to receive a previous TB and/or CSI of a channel on which the UE receives the TB) or after beginning to attempt to decode the TB (e.g., based at least in part on a failed attempt to receive a portion of the TB). For example, the UE may determine that the TB is likely to fail the CRC based at least in part on a CSI of a channel and/or an estimated degradation of the channel based at least in part on an event, such as mobility of the UE and/or detection of an obstruction of a beam used for the channel, among other examples. Additionally, or alternatively, the UE may determine that the TB is likely to fail the CRC based at least in part on a failed attempt to receive a previous TB with a same set of transmission parameters as the transmission of the TB (e.g., based at least in part on not transmitting feedback for the previous TB and/or the channel being a slow changing channel).

As shown by reference number 430, the UE (e.g., as part of receiving the TB) may identify one or more parts of the TB for performing LLR calculations. In some aspects, the UE may identify the one or more parts of the TB before attempting to receive the TB or after beginning to attempt to receive the TB. For example, the UE may identify the one or more parts of the TB after determining that the TB is likely to fail CRC, as described in connection with reference number 425.

In some aspects, the UE may identify the one or more parts of the TB based at least in part on a determination that performing the LLR calculations of the one or more parts of the TB improves a likelihood of passing the CRC in a re-transmission of the TB. In some aspects, the UE may identify the one or more parts of the TB based at least in part on a determination that performing additional LLR calculations of remaining parts of the TB is unnecessary to pass the CRC in the re-transmission of the TB and/or that performing the additional LLR calculations improves the likelihood of passing the CRC in the re-transmission of the TB by an amount that fails to satisfy a threshold (e.g., by an amount from 0 to the threshold).

As shown by reference number 435, the UE (e.g., as part of receiving the TB) may perform the LLR calculations on the one or more parts of the TB. For example, the UE may perform the LLR calculations on the one or more parts of the TB (and not on remaining parts of the TB) based at least in part on the determination that the TB is likely to fail the CRC and/or based at least in part on identifying the one or more parts of the TB. For example, the UE may perform the LLR calculations of the one or more parts of the TB based at least in part on a determination that performing the LLR calculations of the one or more parts of the TB improves a likelihood of passing the CRC in a re-transmission of the TB and/or based at least in part on a determination that performing additional LLR calculations of remaining parts of the TB is unnecessary to pass the CRC in the re-transmission of the TB, among other examples.

As shown by reference number 440, the UE may transmit, and the base station may receive an indication of the one or more parts of the TB for which the UE performed the LLR calculations. In some aspects, the UE may transmit the indication along with a NACK (e.g., in a NACK message). In some aspects, the UE may indicate the one or more parts of the TB using a bitmap having a number of bits that is based at least in part on a configured granularity of the one or more parts for reporting and/or a number of the one or more parts included in the TB, among other examples.

In some aspects, the UE may transmit (or not transmit) the indication based at least in part on a configuration (e.g., as indicated in RRC signaling and/or in a communication protocol, among other examples). For example, the UE may transmit an indication of one or more code block groups, one or more code blocks, and/or one or more code block parts for which the UE performed the LLR calculations based at least in part on a configured granularity for reporting in the indications.

As shown by reference number 445, the base station may configure transmission parameters for a re-transmission of the TB. For example, the transmission parameters for the re-transmission of the TB may be based at least in part on the one or more parts for which the UE performed LLR calculations and/or for which the UE stored information in an IR buffer. In some aspects, the transmission parameters include a redundancy version for the re-transmission, a modulation order for the re-transmission, or precoding for the re-transmission. In some aspects, the base station may configure the transmission parameters to prioritize the one or more parts (e.g., based at least in part on interpreting the UE performing the LLR calculations for the one or more parts as an indication that the one or more parts are received with insufficient signal strength). Alternatively, the base station may configure the transmission parameters to de-prioritize the one or more parts (e.g., based at least in part on interpreting the UE performing the LLR calculations for the one or more parts as an indication that the one or more parts are received with sufficient signal strength).

As shown by reference number 450, the base station may receive, and the base station may transmit a scheduling message for the re-transmission of the TB. For example, the base station may transmit a dynamic scheduling message, such as DCI, to schedule the re-transmission of the TB.

In some aspects, the scheduling message may indicate one or more transmission parameters, such as a redundancy version for the re-transmission that is selected based at least in part on the indication of the one or more parts of the TB for which the UE performed LLR calculations. In some aspects, the scheduling message may indicate one or more transmission parameters, such as a modulation order for the re-transmission that is selected based at least in part on the indication of the one or more parts of the TB for which the UE performed LLR calculations.

As shown by reference number 455, the UE may receive, and the base station may transmit, the re-transmission of the TB. In some aspects, the base station may transmit using the transmission parameters that are based at least in part on the indication of the one or more parts of the TB for which the UE performed LLR calculations. For example, the base station may re-transmit the TB using a redundancy version, an MCS, and/or a precoding, among other examples, that are configured by the base station based at least in part on the indication of the one or more parts of the TB for which the UE performed LLR calculations.

Based at least in part on the UE performing LLR calculations (e.g., processing) one or more parts of the TB based at least in part on a determination that the TB is likely to fail a CRC, the UE may conserve processing and/or power resources that may have otherwise been consumed to perform LLR calculations on all parts of the TB. Additionally, or alternatively, based at least in part on performing the LLR calculations of the one or more parts of the TB that are determined to improve a likelihood of passing the CRC in a re-transmission of the TB, the UE may not damage the likelihood (e.g., reduce the likelihood by a threshold amount) of passing the CRC, in comparison to not performing LLR calculations on any parts of the TB. In this way, the UE may conserve computing, power, network, and/or communication resources that may have otherwise been used to detect and correct a failure of the re-transmission of the TB to pass CRC.

As indicated above, FIG. 4 is provided as an example. Other examples may differ from what is described with regard to FIG. 4.

Figure 5:
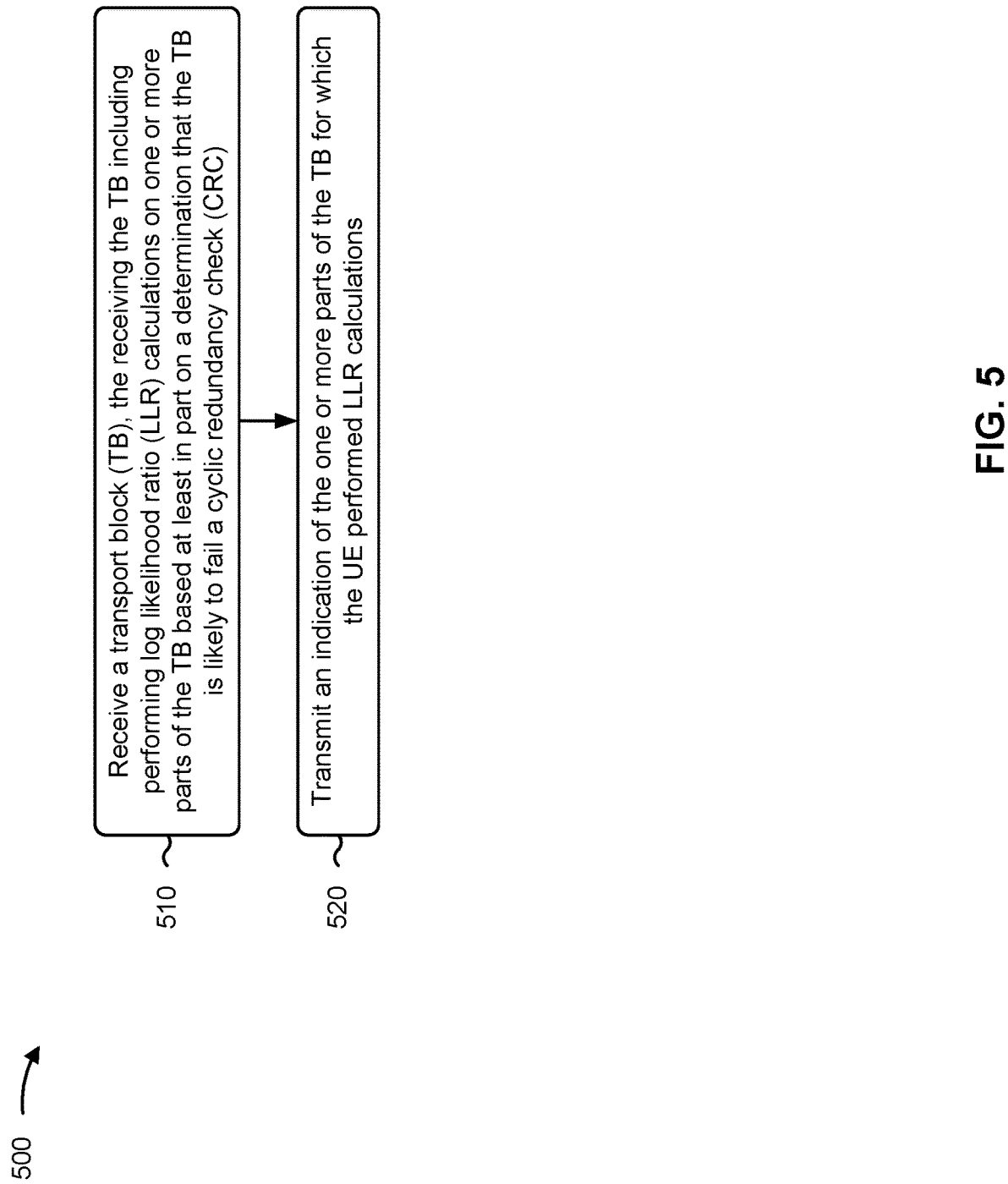
FIGS. 5-6 are diagrams illustrating example processes associated with processing of portions of a transport block that fails a cyclic redundancy check, in accordance with the present disclosure.

FIG. 5 is a diagram illustrating an example process 500 performed, for example, by a UE, in accordance with the present disclosure. Example process 500 is an example where the UE (e.g., UE 120) performs operations associated with processing of portions of a transport block that fails a CRC.

As shown in FIG. 5, in some aspects, process 500 may include receiving a TB, the receiving the TB including performing LLR calculations on one or more parts of the TB based at least in part on a determination that the TB is likely to fail a CRC (block 510). For example, the UE (e.g., using communication manager 140 and/or reception component 702, depicted in FIG. 702) may receive a TB, the receiving the TB including performing LLR calculations on one or more parts of the TB based at least in part on a determination that the TB is likely to fail a CRC, as described above, for example, with reference to FIG. 4.

As further shown in FIG. 5, in some aspects, process 500 may include transmitting an indication of the one or more parts of the TB for which the UE performed LLR calculations (block 520). For example, the UE (e.g., using communication manager 140 and/or transmission component 704, depicted in FIG. 7) may transmit an indication of the one or more parts of the TB for which the UE performed LLR calculations, as described above, for example, with reference to FIG. 4.

Process 500 may include additional aspects, such as any single aspect or any combination of aspects described below and/or in connection with one or more other processes described elsewhere herein.

In a first aspect, process 500 includes receiving a re-transmission of the TB based at least in part on the indication of the one or more parts of the TB for which the UE performed LLR calculations.

In a second aspect, alone or in combination with the first aspect, the re-transmission is associated with transmission parameters that are based at least in part on the indication of the one or more parts of the TB for which the UE performed LLR calculations.

In a third aspect, alone or in combination with one or more of the first and second aspects, process 500 includes transmitting an indication of a capability of the UE to perform LLR calculations on fewer than all parts of the TB based at least in part on the determination that the transport block is likely to fail the CRC.

In a fourth aspect, alone or in combination with one or more of the first through third aspects, process 500 includes determining that the TB is likely to fail the CRC based at least in part on one or more of channeling state information of a channel on which the UE receives the TB, an attempt to receive a portion of the TB, or an attempt to receive a previous TB.

In a fifth aspect, alone or in combination with one or more of the first through fourth aspects, performing the LLR calculations of the one or more parts of the TB is based at least in part on one or more of a determination that performing the LLR calculations of the one or more parts of the TB improves a likelihood of passing the CRC in a re-transmission of the TB, or a determination that performing additional LLR calculations of remaining parts of the TB is unnecessary to pass the CRC in the re-transmission of the TB.

In a sixth aspect, alone or in combination with one or more of the first through fifth aspects, process 500 includes transmitting an indication of a capability of the UE to transmit the indication of the one or more parts of the TB for which the UE performed the LLR calculations.

In a seventh aspect, alone or in combination with one or more of the first through sixth aspects, process 500 includes receiving an indication of a granularity of the one or more parts of the TB, or receiving an indication of a granularity of the indication of the one or more parts of the TB for which the UE performed the LLR calculations.

In an eighth aspect, alone or in combination with one or more of the first through seventh aspects, transmitting the indication of the one or more parts of the TB for which the UE performed the LLR calculations comprises transmitting an indication of one or more code block groups, one or more code blocks, or one or more code block parts for which the UE performed the LLR calculations.

In a ninth aspect, alone or in combination with one or more of the first through eighth aspects, transmitting the indication of the one or more parts of the TB for which the UE performed the LLR calculations comprises transmitting the indication within a negative acknowledgment message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
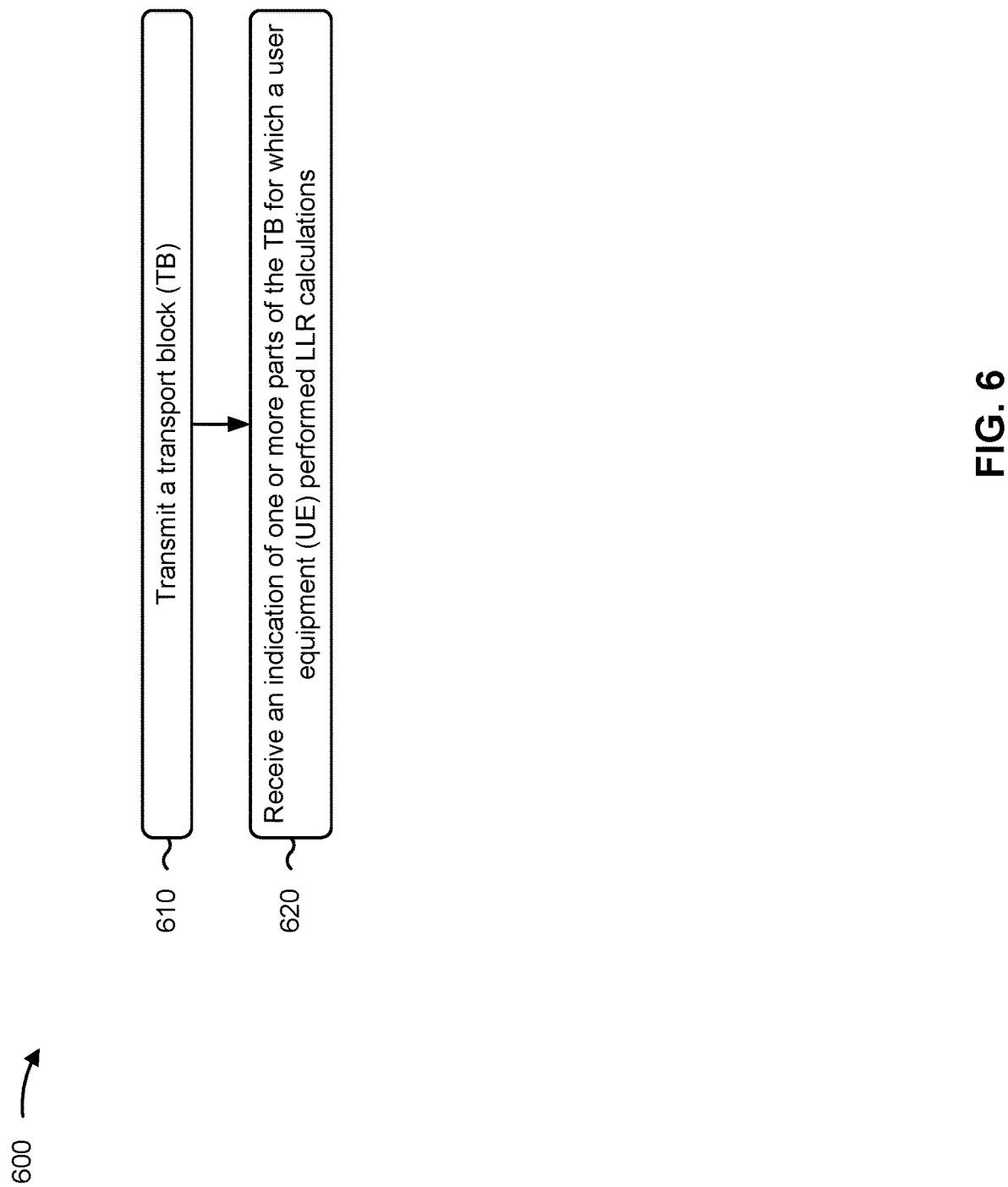

FIG. 6 is a diagram illustrating an example process 600 performed, for example, by a base station, in accordance with the present disclosure. Example process 600 is an example where the base station (e.g., base station 110) performs operations associated with processing of portions of a transport block that fails a CRC.

As shown in FIG. 6, in some aspects, process 600 may include transmitting a TB (block 610). For example, the base station (e.g., using communication manager 150 and/or transmission component 804, depicted in FIG. 8) may transmit a TB, as described above, for example, with reference to FIG. 4.

As further shown in FIG. 6, in some aspects, process 600 may include receiving an indication of one or more parts of the TB for which a UE performed LLR calculations (block 620). For example, the base station (e.g., using communication manager 150 and/or reception component 802, depicted in FIG. 8) may receive an indication of one or more parts of the TB for which a UE performed LLR calculations, as described above, for example, with reference to FIG. 4.

Process 600 may include additional aspects, such as any single aspect or any combination of aspects described below and/or in connection with one or more other processes described elsewhere herein.

In a first aspect, process 600 includes transmitting a re-transmission of the TB based at least in part on the indication of the one or more parts of the TB for which the UE performed LLR calculations.

In a second aspect, alone or in combination with the first aspect, the re-transmission is associated with transmission parameters that are based at least in part on the indication of the one or more parts of the TB for which the UE performed LLR calculations.

In a third aspect, alone or in combination with one or more of the first and second aspects, the transmission parameters that are based at least in part on the indication of the one or more parts of the TB for which the UE performed LLR calculations comprise one or more of a redundancy version for the re-transmission, a modulation order for the re-transmission, or precoding for the re-transmission.

In a fourth aspect, alone or in combination with one or more of the first through third aspects, process 600 includes transmitting downlink control information to schedule the re-transmission, the downlink control information indicating one or more of a redundancy version, for the re-transmission, selected based at least in part on the indication of the one or more parts of the TB for which the UE performed LLR calculations, or a modulation order, for the re-transmission, selected based at least in part on the indication of the one or more parts of the TB for which the UE performed LLR calculations.

In a fifth aspect, alone or in combination with one or more of the first through fourth aspects, process 600 includes receiving an indication of a capability of the UE to perform log likelihood ratio calculations on fewer than all parts of the TB based at least in part on a determination that the transport block is likely to fail a cyclic redundancy check.

In a sixth aspect, alone or in combination with one or more of the first through fifth aspects, process 600 includes receiving an indication of a capability of the UE to transmit the indication of the one or more parts of the TB for which the UE performed LLR calculations.

In a seventh aspect, alone or in combination with one or more of the first through sixth aspects, process 600 includes transmitting an indication of a granularity of the one or more parts of the TB, or transmitting an indication of a granularity of the indication of the one or more parts of the TB for which the UE performed LLR calculations.

In an eighth aspect, alone or in combination with one or more of the first through seventh aspects, receiving the indication of the one or more parts of the TB for which the UE performed the LLR calculations comprises receiving an indication of one or more code block groups, one or more code blocks, or one or more code block parts for which the UE performed the LLR calculations.

In a ninth aspect, alone or in combination with one or more of the first through eighth aspects, receiving the indication of the one or more parts of the TB for which the UE performed the LLR calculations comprises receiving the indication within a negative acknowledgment message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
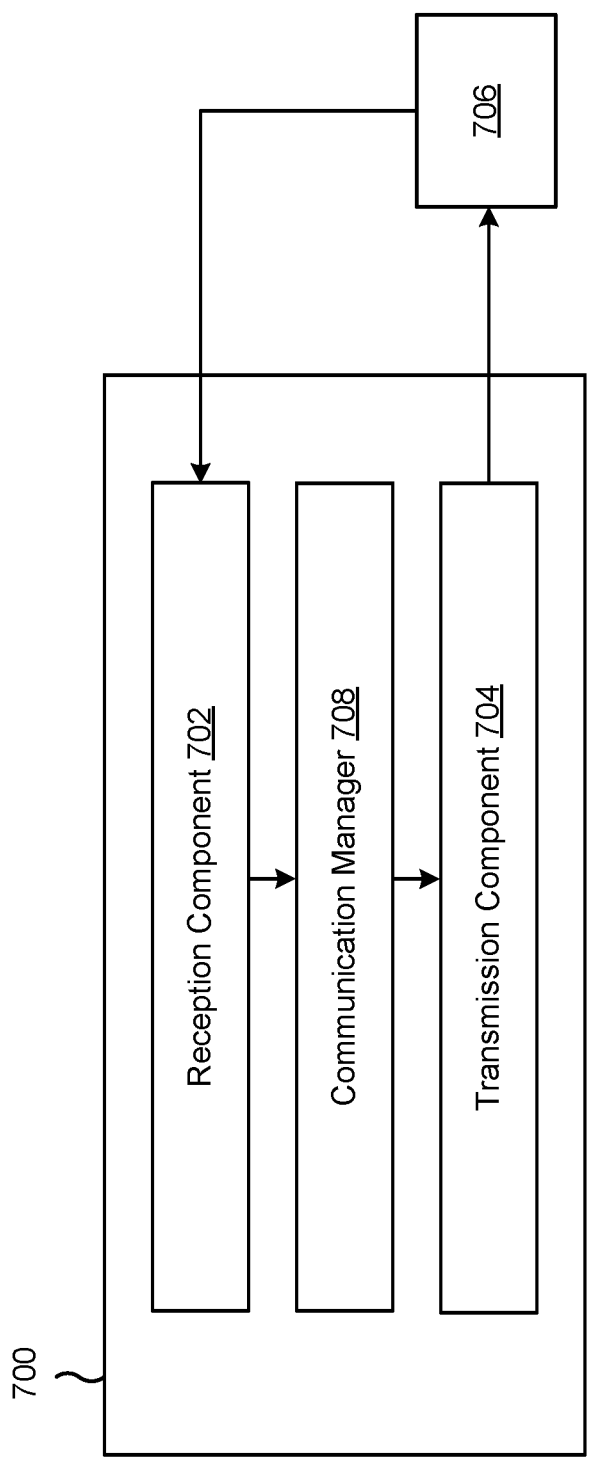
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 (e.g., the communication manager 140).

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a TB including performing LLR calculations on one or more parts of the TB based at least in part on a determination that the TB is likely to fail a CRC. The transmission component 704 may transmit an indication of the one or more parts of the TB for which the UE performed LLR calculations.

The reception component 702 may receive a re-transmission of the TB based at least in part on the indication of the one or more parts of the TB for which the UE performed LLR calculations.

The transmission component 704 may transmit an indication of a capability of the UE to perform LLR calculations on fewer than all parts of the TB based at least in part on the determination that the transport block is likely to fail the CRC.

The communication manager 708 may determine that the TB is likely to fail the CRC based at least in part on one or more of channel state information of a channel on which the UE receives the TB, an attempt to receive a portion of the TB, or an attempt to receive a previous TB.

The transmission component 704 may transmit an indication of a capability of the UE to transmit the indication of the one or more parts of the TB for which the UE performed the LLR calculations.

The reception component 702 may receive an indication of a granularity of the one or more parts of the TB.

The reception component 702 may receive an indication of a granularity of the indication of the one or more parts of the TB for which the UE performed the LLR calculations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
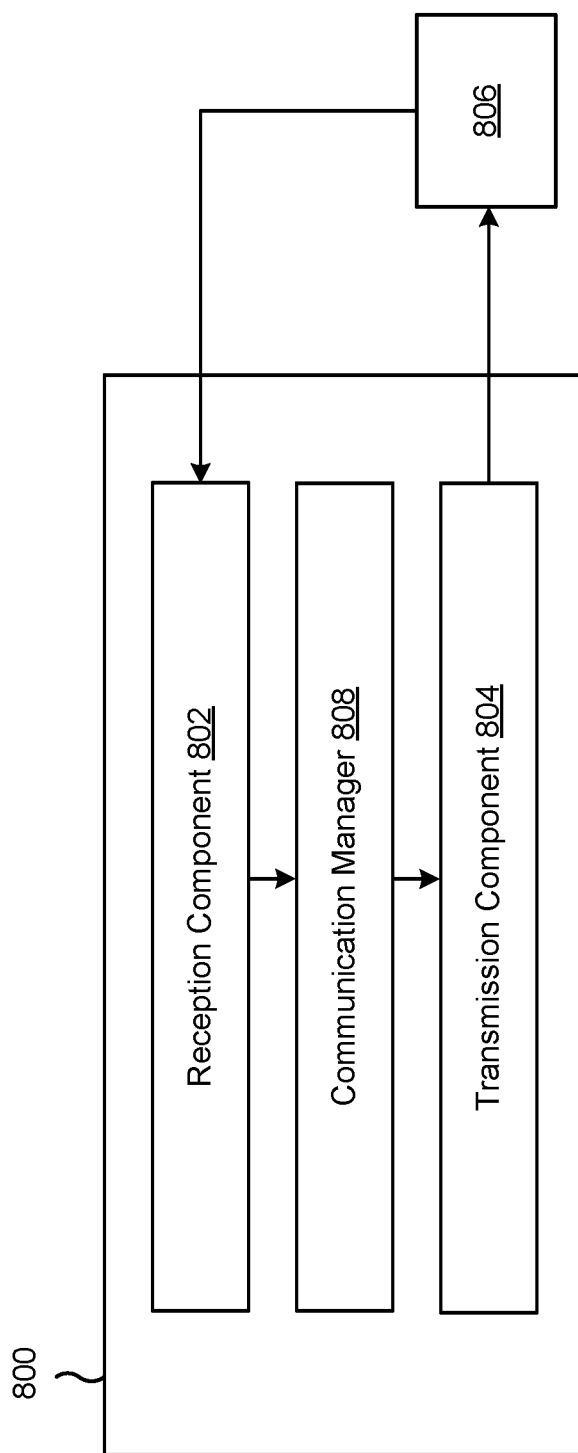

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 (e.g., the communication manager 150).

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a TB. The reception component 802 may receive an indication of one or more parts of the TB for which a UE performed LLR calculations.

The transmission component 804 may transmit a re-transmission of the TB based at least in part on the indication of the one or more parts of the TB for which the UE performed LLR calculations.

The transmission component 804 may transmit downlink control information to schedule the re-transmission, the downlink control information indicating one or more of a redundancy version, for the re-transmission, selected based at least in part on the indication of the one or more parts of the TB for which the UE performed LLR calculations, or a modulation order, for the re-transmission, selected based at least in part on the indication of the one or more parts of the TB for which the UE performed LLR calculations.

The reception component 802 may receive an indication of a capability of the UE to perform log likelihood ratio calculations on fewer than all parts of the TB based at least in part on a determination that the transport block is likely to fail a cyclic redundancy check.

The reception component 802 may receive an indication of a capability of the UE to transmit the indication of the one or more parts of the TB for which the UE performed LLR calculations.

The transmission component 804 may transmit an indication of a granularity of the one or more parts of the TB.

The transmission component 804 may transmit an indication of a granularity of the indication of the one or more parts of the TB for which the UE performed LLR calculations.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a transport block (TB), the receiving the TB including performing log likelihood ratio (LLR) calculations on one or more parts of the TB based at least in part on a determination that the TB is likely to fail a cyclic redundancy check (CRC); and transmitting an indication of the one or more parts of the TB for which the UE performed LLR calculations.

Aspect 2: The method of Aspect 1, further comprising: receiving a re-transmission of the TB based at least in part on the indication of the one or more parts of the TB for which the UE performed LLR calculations.

Aspect 3: The method of Aspect 2, wherein the re-transmission is associated with transmission parameters that are based at least in part on the indication of the one or more parts of the TB for which the UE performed LLR calculations.

Aspect 4: The method of any of Aspects 1-3, further comprising: transmitting an indication of a capability of the UE to perform LLR calculations on fewer than all parts of the TB based at least in part on the determination that the transport block is likely to fail the CRC.

Aspect 5: The method of any of Aspects 1-4, further comprising determining that the TB is likely to fail the CRC based at least in part on one or more of: channel state information of a channel on which the UE receives the TB, an attempt to receive a portion of the TB, or an attempt to receive a previous TB.

Aspect 6: The method of any of Aspects 1-5, wherein performing the LLR calculations of the one or more parts of the TB is based at least in part on one or more of: a determination that performing the LLR calculations of the one or more parts of the TB improves a likelihood of passing the CRC in a re-transmission of the TB, or a determination that performing additional LLR calculations of remaining parts of the TB is unnecessary to pass the CRC in the re-transmission of the TB.

Aspect 7: The method of any of Aspects 1-6, further comprising: transmitting an indication of a capability of the UE to transmit the indication of the one or more parts of the TB for which the UE performed the LLR calculations.

Aspect 8: The method of any of Aspects 1-7, further comprising: receiving an indication of a granularity of the one or more parts of the TB, or receiving an indication of a granularity of the indication of the one or more parts of the TB for which the UE performed the LLR calculations.

Aspect 9: The method of any of Aspects 1-8, wherein transmitting the indication of the one or more parts of the TB for which the UE performed the LLR calculations comprises: transmitting an indication of one or more code block groups, one or more code blocks, or one or more code block parts for which the UE performed the LLR calculations.

Aspect 10: The method of any of Aspects 1-9, wherein transmitting the indication of the one or more parts of the TB for which the UE performed the LLR calculations comprises: transmitting the indication within a negative acknowledgment message.

Aspect 11: A method of wireless communication performed by a base station, comprising: transmitting a transport block (TB); and receiving an indication of one or more parts of the TB for which a user equipment (UE) performed LLR calculations.

Aspect 12: The method of Aspect 11, further comprising: transmitting a re-transmission of the TB based at least in part on the indication of the one or more parts of the TB for which the UE performed LLR calculations.

Aspect 13: The method of Aspect 12, wherein the re-transmission is associated with transmission parameters that are based at least in part on the indication of the one or more parts of the TB for which the UE performed LLR calculations.

Aspect 14: The method of Aspect 13, wherein the transmission parameters that are based at least in part on the indication of the one or more parts of the TB for which the UE performed LLR calculations comprise one or more of: a redundancy version for the re-transmission, a modulation order for the re-transmission, or precoding for the re-transmission.

Aspect 15: The method of Aspect 12, further comprising transmitting downlink control information to schedule the re-transmission, the downlink control information indicating one or more of: a redundancy version, for the re-transmission, selected based at least in part on the indication of the one or more parts of the TB for which the UE performed LLR calculations, or a modulation order, for the re-transmission, selected based at least in part on the indication of the one or more parts of the TB for which the UE performed LLR calculations.

Aspect 16: The method of any of Aspects 11-15, further comprising: receiving an indication of a capability of the UE to perform log likelihood ratio calculations on fewer than all parts of the TB based at least in part on a determination that the transport block is likely to fail a cyclic redundancy check.

Aspect 17: The method of any of Aspects 11-16, further comprising: receiving an indication of a capability of the UE to transmit the indication of the one or more parts of the TB for which the UE performed LLR calculations.

Aspect 18: The method of any of Aspects 11-17, further comprising: transmitting an indication of a granularity of the one or more parts of the TB, or transmitting an indication of a granularity of the indication of the one or more parts of the TB for which the UE performed LLR calculations.

Aspect 19: The method of any of Aspects 11-18, wherein receiving the indication of the one or more parts of the TB for which the UE performed the LLR calculations comprises: receiving an indication of one or more code block groups, one or more code blocks, or one or more code block parts for which the UE performed the LLR calculations.

Aspect 20: The method of any of Aspects 11-19, wherein receiving the indication of the one or more parts of the TB for which the UE performed the LLR calculations comprises: receiving the indication within a negative acknowledgment message.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a transport block (TB);
      perform log likelihood ratio (LLR) calculations on fewer than all parts of the TB based at least in part on a determination, by the UE, that the TB is likely to fail a cyclic redundancy check (CRC),
      the determination that the TB is likely to fail the CRC based at least in part on one or more of channel state information of a channel on which the UE receives the TB or an attempt to receive a previous TB, and
      the determination that the TB is likely to fail the CRC being further based at least in part on a determination, by the UE, that performing the LLR calculations on the fewer than all the parts of the TB improves a likelihood of passing a subsequent CRC in a re-transmission of the TB; and
      transmit an indication of the fewer than all the parts of the TB for which the UE performed the LLR calculations.

2. The UE of claim 1, wherein the one or more processors are further configured to:
   receive the re-transmission of the TB based at least in part on the indication of the fewer than all the parts of the TB for which the UE performed the LLR calculations.

3. The UE of claim 2, wherein the re-transmission is associated with transmission parameters that are based at least in part on the indication of the fewer than all the parts of the TB for which the UE performed the LLR calculations.

4. The UE of claim 1, wherein the one or more processors are further configured to:
transmit an indication of a capability of the UE to perform the LLR calculations on the fewer than all the parts of the TB based at least in part on the determination that the TB is likely to fail the CRC.

5. The UE of claim 1, wherein the one or more processors are configured to determine that the TB is likely to fail the CRC based at least in part on the attempt to receive the previous TB based at least in part on the previous TB and the TB being transmitted with a same set of transmission parameters.

6. The UE of claim 1, wherein performing the LLR calculations of the fewer than all the parts of the TB is further based at least in part on:
a determination that performing additional LLR calculations of remaining parts of the TB is unnecessary to pass the subsequent CRC in the re-transmission of the TB.

7. The UE of claim 1, wherein the one or more processors are further configured to:
transmit an indication of a capability of the UE to transmit the indication of the fewer than all the parts of the TB for which the UE performed the LLR calculations.

8. The UE of claim 1, wherein the one or more processors are further configured to:
receive an indication of a granularity of the fewer than all the parts of the TB, or
receive an indication of a granularity of the indication of the fewer than all the parts of the TB for which the UE performed the LLR calculations.

9. The UE of claim 1, wherein the one or more processors, to transmit the indication of the fewer than all the parts of the TB for which the UE performed the LLR calculations, are configured to:
transmit an indication of one or more code block groups, one or more code blocks, or one or more code block parts for which the UE performed the LLR calculations.

10. The UE of claim 1, wherein the one or more processors, to transmit the indication of the fewer than all the parts of the TB for which the UE performed the LLR calculations, are configured to:
transmit the indication within a negative acknowledgment message.

11. A base station for wireless communication, comprising:
a memory; and
one or more processors, coupled to the memory, configured to:
transmit configuration information indicating that a user equipment (UE) is to perform log likelihood ratio (LLR) calculations for fewer than all parts of a transport block (TB) based at least in part on a determination, by the UE, that the TB is likely to fail a cyclic redundancy check (CRC), the determination that the TB is likely to fail the CRC being based at least in part on one or more of the determination that the TB is likely to fail the CRC based at least in part on one or more of channel state information of a channel on which the UE receives the TB or an attempt to receive a previous TB; and
receive an indication of the fewer than all parts of the TB for which the UE performed the LLR calculations.

12. The base station of claim 11, wherein the one or more processors are further configured to:
transmit a re-transmission of the TB based at least in part on the indication of the fewer than all the parts of the TB for which the UE performed the LLR calculations.

13. The base station of claim 12, wherein the re-transmission is associated with transmission parameters that are based at least in part on the indication of the fewer than all the parts of the TB for which the UE performed the LLR calculations.

14. The base station of claim 13, wherein the transmission parameters that are based at least in part on the indication of the fewer than all the parts of the TB for which the UE performed the LLR calculations comprise one or more of:
a redundancy version for the re-transmission,
a modulation order for the re-transmission, or
precoding for the re-transmission.

15. The base station of claim 12, wherein the one or more processors are further configured to transmit downlink control information to schedule the re-transmission, the downlink control information indicating one or more of:
a redundancy version, for the re-transmission, selected based at least in part on the indication of the fewer than all the parts of the TB for which the UE performed the LLR calculations, or
a modulation order, for the re-transmission, selected based at least in part on the indication of the fewer than all the parts of the TB for which the UE performed the LLR calculations.

16. The base station of claim 11, wherein the one or more processors are further configured to:
receive an indication of a capability of the UE to perform the LLR calculations on the fewer than all the parts of the TB based at least in part on the determination that the TB is likely to fail the CRC.

17. The base station of claim 11, wherein the one or more processors are further configured to:
receive an indication of a capability of the UE to transmit the indication of the fewer than all the parts of the TB for which the UE performed the LLR calculations.

18. The base station of claim 11, wherein the one or more processors are further configured to:
transmit an indication of a granularity of the fewer than all the parts of the TB for which the UE performed the LLR calculations, or
transmit an indication of a granularity of the indication of the fewer than all the parts of the TB for which the UE performed the LLR calculations.

19. The base station of claim 11, wherein the one or more processors, to receive the indication of the fewer than all the parts of the TB for which the UE performed the LLR calculations, are configured to:
receive an indication of one or more code block groups, one or more code blocks, or one or more code block parts for which the UE performed the LLR calculations.

20. The base station of claim 11, wherein the one or more processors, to receive the indication of the fewer than all the parts of the TB for which the UE performed the LLR calculations, are configured to:
receive the indication within a negative acknowledgment message.

21. A method of wireless communication performed by a user equipment (UE), comprising:
receiving a transport block (TB);
performing log likelihood ratio (LLR) calculations on fewer than all parts of the TB based at least in part on a determination, by the UE, that the TB is likely to fail a cyclic redundancy check (CRC), the determination that the TB is likely to fail the CRC based at least in part on one or more of channel state information of a channel on which the UE receives the TB or an attempt to receive a previous TB, and the determination that the TB is likely to fail the CRC being further based at least in part on a determination, by the UE, that performing the LLR calculations on the fewer than all the parts of the TB improves a likelihood of passing a subsequent CRC in a re-transmission of the TB; and transmitting an indication of the fewer than all the parts of the TB for which the UE performed the LLR calculations.

22. The method of claim 21, further comprising:
receiving the re-transmission of the TB based at least in part on the indication of the fewer than all the parts of the TB for which the UE performed the LLR calculations.

23. The method of claim 22, wherein the re-transmission is associated with transmission parameters that are based at least in part on the indication of the fewer than all the parts of the TB for which the UE performed the LLR calculations.

24. The method of claim 21, wherein performing the LLR calculations of the fewer than all the parts of the TB is further based at least in part on:
a determination that performing additional LLR calculations of remaining parts of the TB is unnecessary to pass the subsequent CRC in the re-transmission of the TB.

25. The method of claim 21, further comprising:
receiving an indication of a granularity of the fewer than all the parts of the TB for which the UE performed the LLR calculations, or
receiving an indication of a granularity of the indication of the fewer than all the parts of the TB for which the UE performed the LLR calculations.

26. A method of wireless communication performed by a base station, comprising:
transmitting configuration information indicating that a user equipment (UE) is to perform log likelihood ratio (LLR) calculations for fewer than all parts of a transport block (TB) based at least in part on a determination, by the UE, that the TB is likely to fail a cyclic redundancy check (CRC), the determination that the TB is likely to fail the CRC being based at least in part on one or more of the determination that the TB is likely to fail the CRC based at least in part on one or more of channel state information of a channel on which the UE receives the TB or an attempt to receive a previous TB; and
receiving an indication of the fewer than all parts of the TB for which the UE performed the LLR calculations.

27. The method of claim 26, further comprising:
transmitting a re-transmission of the TB based at least in part on the indication of the fewer than all the parts of the TB for which the UE performed the LLR calculations.

28. The method of claim 27, wherein the re-transmission is associated with transmission parameters that are based at least in part on the indication of the fewer than all the parts of the TB for which the UE performed the LLR calculations.

29. The method of claim 28, wherein the transmission parameters that are based at least in part on the indication of the fewer than all the parts of the TB for which the UE performed the LLR calculations comprise one or more of:
a redundancy version for the re-transmission,
a modulation order for the re-transmission, or
precoding for the re-transmission.

30. The method of claim 27, further comprising transmitting downlink control information to schedule the re-transmission, the downlink control information indicating one or more of:
a redundancy version, for the re-transmission, selected based at least in part on the indication of the fewer than all the parts of the TB for which the UE performed the LLR calculations, or
a modulation order, for the re-transmission, selected based at least in part on the indication of the fewer than all the parts of the TB for which the UE performed the LLR calculations.

31. The method of claim 26, further comprising:
receiving an indication of a capability of the UE to perform the LLR calculations on the fewer than all the parts of the TB based at least in part on the determination that the transport block is likely to fail the CRC.

\* \* \* \* \*